_FIG_4_

_FIG_7_

United States Patent Office 3,427,944
Patented Feb. 18, 1969

3,427,944
TOPOGRAPHIC PANORAMA CAMERA
David D. Hatfield, Altadena, Calif., assignor to Card-Key Systems, Inc., Burbank, Calif., a corporation of California
Filed Dec. 13, 1965, Ser. No. 513,496
U.S. Cl. 95—15
Int. Cl. C03b 37/00
9 Claims

ABSTRACT OF THE DISCLOSURE

A typographical survey camera in which a rotatable turret houses an optical system arranged to cast an image, erect relative to the axis of rotation of the turret, on a sheet of film disposed in a housing to which the turret is mounted, the camera producing a circular picture of a scene scanned by the turret. The camera includes means for local or remote operation of film advance, turret scanning and shuttering functions of the camera so that accurate surveys may be obtained by only a single individual in minimum time.

---

This invention relates to a panoramic camera and, more particularly, to a camera adapted for use in topographic analysis and surveying.

Conventional surveying methods using a transit, stadia rod and surveyor's chain require the use of at least two persons at the survey site. The ultimate survey result is dependent upon the accuracy of measurements made at the site. If an error in the survey result is discovered, correction of the error usually requires that the site be resurveyed. The surveyor's original measurements cannot be used because the source of the error usually is in these figures.

In an effort to simplify surveying techniques and to improve the accuracy of the ultimate surveying result, photographic methods of surveying have been proposed, together with cameras for making the photographic records required in these methods. Such photographic methods require the use of at least two persons. One such arrangement is disclosed in British Patent 175,806. This invention provides an improved camera for use in conjunction with photographic surveying methods. The camera is so constructed that all work required at the survey site may be performed by a single person. This feature is provided by equipping the camera with a mechanism for controlling camera operation from a remote location.

The camera provided by this invention nearly eliminates the need for the surveyor to make field notes, thereby reducing if not eliminating the possibility of errors and transpositions. As a corollary, additional time is saved since further field checks and verifications are not required. The record provided by the camera shows all objects in the surveyed area, together with rods and stadia, from which distance, height and depth can be ascertained. Since the camera enables a great reduction in the time required for a survey, it also reduces the cost of the survey.

Generally speaking, this invention provides a camera for use in surveying and the like. The camera includes a housing defining an opening through an upper portion of its extent, the opening having substantially coplanar boundaries. Film guide means are provided for guiding a length of photographic film along a selected path in the housing past the opening. An optics turret is mounted to the housing over the opening for rotation about an axis normal to the plane of the opening. An optical system is carried by the turret and includes an objective lens and a reflector which are arranged to define an optical axis having a first portion normal to the turret rotational axis and a second portion. The second portion of the optical axis passes parallel to the turret rotational axis and is spaced from the turret rotational axis on the side thereof opposite from the objective lens. The second portion of the optical axis passes through the housing opening to intersect the portion of the film path adjacent the opening. The optical system also includes an exposure aperture member mounted for rotation with the turret. This member defines an aperture radially of the turret rotational axis through which the second portion of the optical axis passes. The camera also includes means for rotating the turret about its rotational axis so that there is formed on film disposed adjacent the housing opening a latent image of a scene swept by the objective lens. Because of the arrangement of the optical system, the latent image is erect relative to the turret rotational axis. Controllable means are provided for indexing photographic film sequentially along the selected path. Also, the camera includes means for securing the film in a predetermined position adjacent the opening between operations of the film indexing means.

The above-mentioned and other features of the present invention are more fully set forth in the following detailed description of a presently preferred embodiment of the invention, this description being presented by reference to the accompanying drawings wherein:

FIG. 2 is a top plan view, with parts broken away, of the camera shown in FIG. 1;

Figure 1:
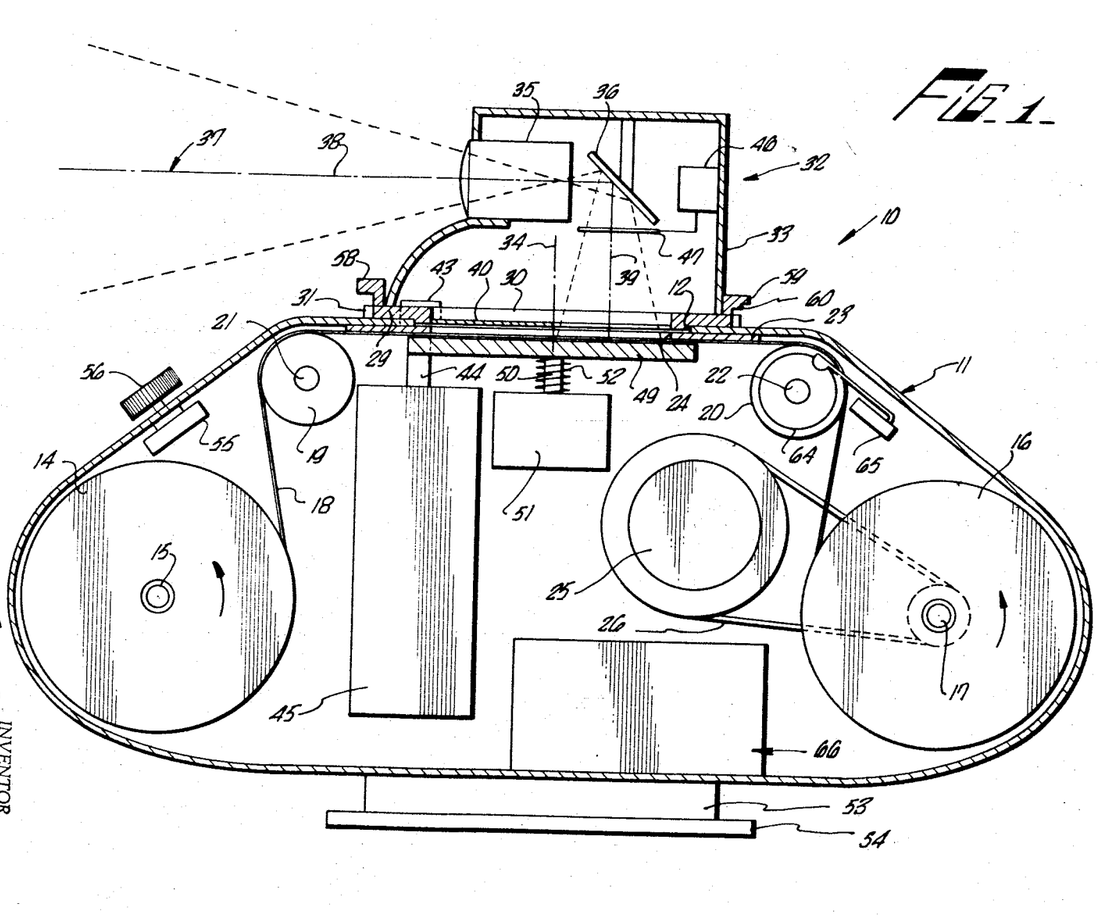
FIG. 1 is a side elevation, partially broken away, of a topographic panoramic camera according to this invention.

A topographic panorama camera 10, as shown in FIGS. 1 and 2, includes a housing 11 defining an opening 12 from a chamber 13 within the housing to the exterior of the housing. The opening is provided at the upper extent of the housing and preferably is circular in configuration and has its boundaries lying in a common plane. A photographic film supply drum or roller 14 is rotatably mounted on a shaft 15 in the chamber adjacent one end of the housing. A film take-up drum or roller 16 is rotatably mounted on a shaft 17 in the chamber adjacent the other end of the housing. A strip of photographic film 18 is passed along a selected path through the housing from the film supply drum to the take-up drum over film guide rollers 19 and 20 rotatably mounted on parallel shafts 21 and 22, respectively. The film guide rollers are spaced apart from each other on opposite sides of opening 12 so that the path along which the film moves has a straight portion adjacent opening 12 within the housing. An annular plate 23 is secured to the housing adjacent opening 12 and defines a preferably circular opening 24; the film passes across the underside of plate 23.

Film take-up drum 16 is driven by an electric motor 25 mounted within the housing and coupled to the take-up drum by a belt 26.

A gear 29 is rotatably mounted in the housing opening and has an annular bore 30 having a diameter corresponding to the diameter of the opening in plate 23. Also, the gear has external teeth 31. An optics turret 32 includes a housing 33 mounted to the upper side of the gear in such a manner that the gear teeth lie radially outwardly of the turret housing from the axis of rotation 34 of the gear.

An objective lens assembly 35 and a reflector 36 are mounted in the turret housing and are components of an optical system having an optical axis 37. The optical axis has a first portion 38 which lies normal to and intersects the turret axis of rotation 34. The optical axis has a second portion 39 which lies parallel to, but is spaced from, the turret axis of rotation on the side of the turret axis opposite from the objective lens system. The second portion of the optical axis passes through openings 24 and 31 of plate 23 and gear 30, respectively. Preferably, the reflector is a mirror disposed at an angle of 45 degrees to the turret axis of rotation. The optical system is so arranged that an image of a scene scanned by the objective lens system is projected upon film 18 in such a manner that the image is erect relative to the turret axis of rotation. In other words, a light ray entering the objective lens below the optical axis ultimately intersects the film at a point lying between the intersections of the optical axis and axis 34 with the film, and conversely for a ray entering the objective lens above the optical axis.

The optical system also includes an aperture plate 40 mounted within the central bore of the gear adjacent the upper side of plate 23. The aperture member defines an exposure aperture 41 which extends radially of the aperture plate from the turret axis of rotation. As shown in FIG. 2, the aperture has a wedge-shaped configuration and increases in width linearly proceeding from the turret axis of rotation to the outer diameter of gear bore 30 to assure that all locations of the film radially from axis 34 are equally exposed during a rotation of turret 32.

A turret drive pinion gear 43 is engaged with gear 29 on the exterior of housing 11. The pinion gear is connected to the rotatable shaft 44 of a turret drive motor 45 disposed in the housing. Upon operation of the turret drive motor, the turret is rotated about axis 34 to sweep an arc of 360 degrees and thereby record on film 18 below housing opening 12 a latent image of the scene scanned by objective lens system 35.

A rotary solenoid 46 is mounted within the turret housing and is coupled to a shutter plate 47. The rotary solenoid is operated during rotation of the turret relative to the housing to move the shutter plate out of alignment with optical axis 37, but is unoperated when the turret is stationary to prevent the transmission of light to the film from the objective lens system. Operation of the rotary solenoid is controlled by a limit switch 48 (see FIG. 3) disposed in the turret housing and operated by a suitable cooperating projection (not shown) secured to the housing; if desired, however, the projection controlling operation of switch 48 could be movable relative to a fixed switch without departing from the scope of this invention.

A pressure plate 49 is disposed below and parallel to stationary plate 23 and has a diameter greater than the diameter of opening 24 in the stationary plate. The pressure plate is mounted to a reciprocable armature 50 of a solenoid 51 disposed in the housing. A compression spring 52 surrounds the armature between the solenoid and the pressure plate and normally biases the pressure plate into engagement with the underside of the film to clamp the film between the pressure plate and the stationary plate. The pressure plate urges the film below aperture member 40 into the focal plane of objective lens system 35 and maintains the film in this position during rotation of the turret. Solenoid 51 is operated to disengage the pressure plate from the film only during advancement of the film, i.e., during operation of film drive motor 25.

A mounting plate 53 is secured to the underside of housing 11 so that the camera may be mounted to the platform 54 of a transit tripod or the like in such a manner that the turret axis of rotation is vertical during operation of the camera.

A three-position rotary switch 55 is disposed in the housing and is operated by a knob 56 located on the exterior of the camera housing.

As shown in FIGS. 1 and 2, an annular cam ring 58 is secured to the turret for rotation therewith in response to operation of turret drive motor 45. The cam ring defines two cam surfaces 59 and 60 which are, respectively, a turret sweep control cam surface and a film advance timing control surface. A turret sweep control limit switch 61 is engaged with cam surface 59 and a film advance time control limit switch 62 is engaged with cam surface 60. Each of limit switches 61 and 62 is fixed relative to camera housing 11, but it will be understood that the switches could be movable with the turret relative to fixed cam surfaces without departing from the scope of this invention. Switch 61 is open when the turret is stationary before the commencement of a rotation of the turret, and closes as soon as the turret begins to rotate and stays closed until one rotation of the turret is completed. Switch 62 is connected to a time delay relay 63 (see FIG. 3) located within the housing and is normally open. Cam surface 60 is contoured so that switch 62 closes a predetermined time before the completion of a turret rotation and stays closed until the turret rotation is completed; switch 62 opens at the instant the turret completes a rotation. The time delay relay, having normally open switch contacts, times out after the turret comes to a stop after a rotation thereof.

Figure 3:
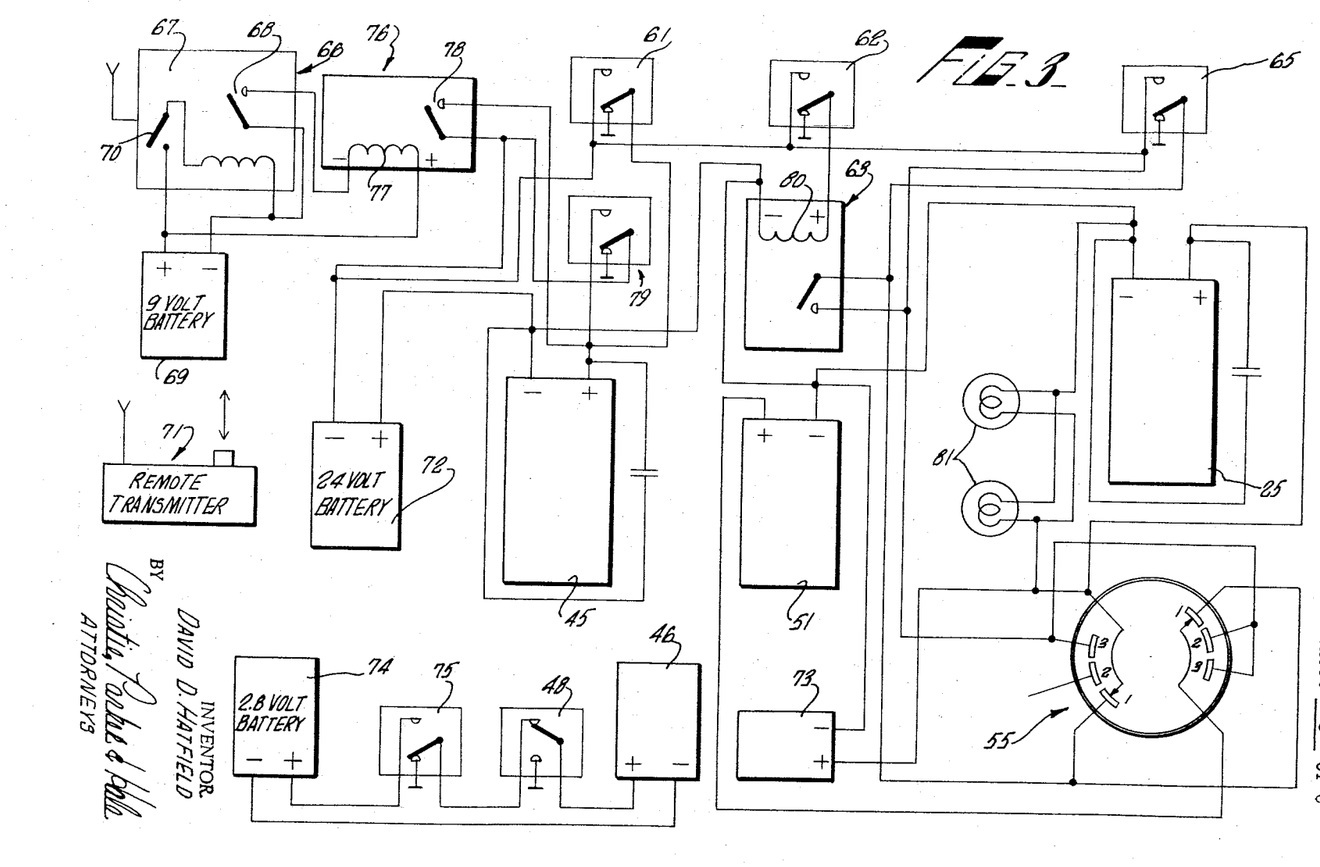
FIG. 3 is a schematic diagram of the electrical system of the camera shown in FIGS. 1 and 2.

Film guide roller 20 carries a cam 64 which cooperates with and controls the operation of a film advance control limit switch 65. Cam 64 is contoured so that switch 65 is open when film 18 is not moving, so that switch 65 is closed for a time equal to the time required to advance the film one frame past opening 24, and so that the switch is opened after the film has been advanced one frame. As shown in FIG. 3, switch 65 is connected in parallel across the contacts of the time delay relay to control operation of pressure plate solenoid 51 and film advance motor 25. (In FIG. 3, cam actuated switch contacts are shown as contacts connected to a flat member outside the switch housing, as, for example, switch 65.)

A remote control radio signal receiver 66 is located within camera housing 11 as shown in FIG. 1. The receiver includes a relay 67 having switch contacts 68 operated in response to energization of a winding coupled across a 9 volt battery 69 via a normally open switch 70. Switch 70 is operated in response to receipt of an electrical signal generated at transmitter 71 by depression of an actuator button incorporated into the transmitter. The transmitter and the receiver are of conventional construction. Preferably, the transmitter is built into a stadia rod with which the camera is used. The transmitter 71 is preferred over a signal generator coupled to the camera by a cable since the nature of the terrain being surveyed may make movement of a cable difficult.

Also included in the housing is a battery 72, preferably a 24 volt battery, for powering the turret drive and film advance motors. A pulse counter 73 is located in the housing and is normally connected in series with the pressure plate solenoid via rotary switch 55. A battery 74, preferably a 2.8 volt battery, is located in turret 32 and is coupled across rotary solenoid 46 via switch 48 and a manually operated shutter master control switch 75 connected in series with switch 48.

Also located in the camera housing is a relay 76 having a coil 77 coupled across battery 69 in series with the normally open contacts of relay 67, and having normally open contacts 78 coupled across battery 72 in parallel with turret sweep control switch 61. Connected across battery 72 in parallel with switches 61 and 78 is a manually operable turret sweep start switch 79.

To operate camera 10 for the purposes of surveying a site, two locations at the site, each visible from the other, are chosen and the distance between these locations is noted; this is the only measurement required to be made at the site. Each location is flagged so as to be marked in a photograph taken at the other location. The camera is then set up, preferably on a surveyor's tripod, directly over one of the two chosen locations, and the tripod platform is levelled so that the rotational axis of camera turret 32 is vertical. If only the position of one or more selected objects (each object being visible from both chosen locations) is to be determined by the survey, only a single picture need be taken at this location; in such an instance the camera is operated by manually operating switch 79. The camera is then set up in like manner over the other location and a second photograph is made. If any further objects of interest are not visible from both chosen locations but are visible from one or the other of the chosen locations, additional photos are made from other locations from which further selected objects and at least one of the flags for the chosen locations are visible. The on-site work is then completed.

More commonly, however, the elevation of at least one point relative to a bench mark on the site must be determined as a part of the survey. In such a case, two locations are selected, measured, and flagged as before; the locations should be selected so that as many of the points of interest as possible are visible or nearly visible from both locations. When the first photo is taken from one of the two chosen locations, the operator holds a stadia rod vertically over the other chosen location and operates the camera from that point by the transmitter built into the stadia rod. The operator then moves to the other points of interest, places a stadia rod vertically over each point, and operates the camera from each of the points to take a corresponding number of pictures. For the purposes of confirmation, the camera is then set up over the other chosen location and the process is repeated, the camera being operated each time from a remote location where the operator holds a stadia rod. If any point should be so situated that the stadia rod placed thereover is not visible from one of the chosen locations, the camera is set up at a third location from which one or the other of the chosen locations is visible and an appropriate number of additional photos are made. A point is considered to be obscured when the lowermost stadia mark on the rod is above the plane defined by portion 38 of camera optical axis 37 during a rotation of the camera turret.

When the camera is being operated from a remote location, closure of switch 70 (see FIG. 3) operates relay 67 so that contacts 68 are closed and coil 77 of relay 76 is energized. As coil 77 is energized, contacts 78 of relay 76 close and turret drive motor 45 is operated to begin rotation of turret 32. As soon as the turret begins to move, switches 48 and 61 are closed. If switch 75 has previously been closed manually, closure of switch 48 operates shutter plate solenoid 46 and moves shutter plate 47 from alignment with exposure aperture 41. Closure of switch 61, coupled in parallel with relay contacts 78, assures that motor 45 will continue to operate to rotate the turret through an arc of 360 degrees even after switch 71 (or switch 79 in the case of nonremote starting of the camera) is opened.

Two seconds before the turret completes its rotation, cam surface 60 causes switch 62 to close to energize the timing mechanism of time delay relay 63. Preferably the timing mechanism is a thermal device operated by energization of a coil 80 connected between switch 62 and battery 72. As the turret completes its rotation, switch 62 closes and the timing mechanism then times out to close the switch contacts of the time delay relay at least momentarily. Momentary closure of the delay relay contacts operates film advance motor 25 to advance the film and to rotate film guide roller 20 at least a small amount. As roller 20 is rotated, switch 65, coupled in parallel with the delay relay switch contacts, is closed to continue operation of motor 25 after the delay relay contacts open. Also, the initial closure of the delay relay contacts energizes pressure plate solenoid 51 to unclamp the pressure plate from film 18; closure of switch 65 holds the pressure plate in a released condition. The first pulse of current to the solenoid operates film frame counter 73. When film guide roller 20 has rotated an amount corresponding to a film advance of one frame, switch 65 is opened and the camera is ready for operation to take another photograph.

A pair of pilot lights 81, disposed on opposite sides of the camera housing, are coupled across film advance motor 25 and are lit when the motor is running. The pilot lights inform an operator at a remote location that the camera is not yet ready for commencement of another picture-taking operation.

Rotary switch 55 is provided for loading the camera. When the rotary switch is in position 1 (shown in FIG. 3), the operation of the camera is as above described. When the rotary switch is in position 2, pressure plate solenoid 51 is energized so the film may be threaded through the camera. When the rotary switch is in position 3, the pressure plate solenoid and the film advance motor are operated to take up the slack in the film.

Figure 4:
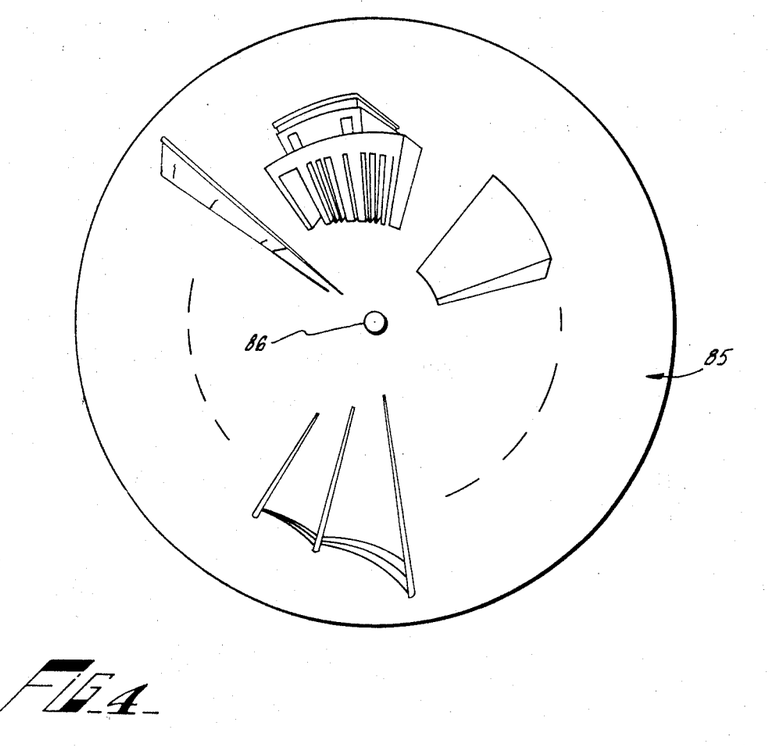
FIG. 4 is a view of a typical picture produced by the camera shown in FIGS. 1 and 2.

FIG. 4 shows a developed and enlarged print of a photograph 85 taken by camera 10. Because of the construction and arrangement of the optical system in turret 32, the image provided in photograph 85 is erect relative to its center 86 which corresponds to rotational axis 34 of the turret. This characteristic of photograph 85, as shown below, is of advantage in the preparation of a survey plot from such photographs.

Figures 5, 6:
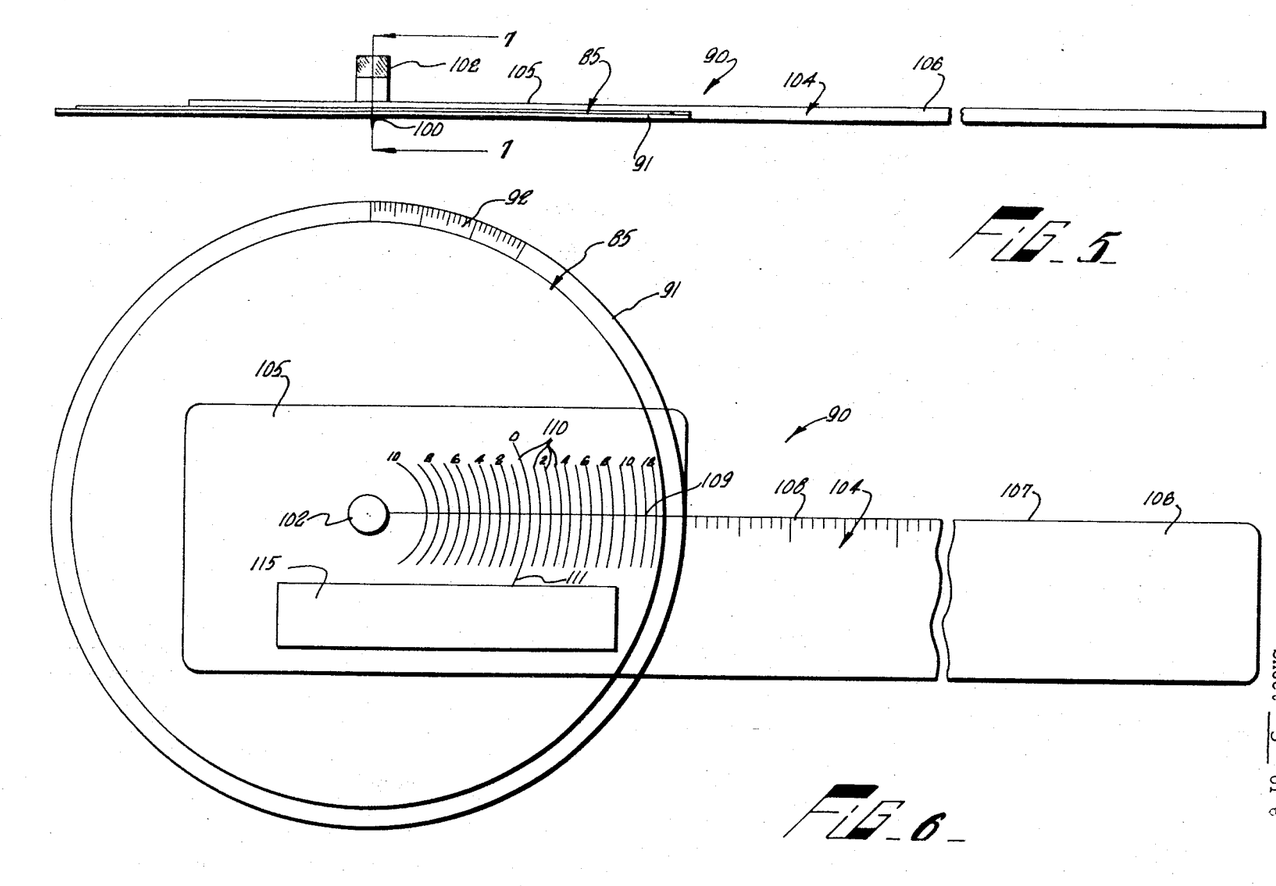
FIG. 5 is a side elevation view of a plotting device useful in developing a survey plot from photographs of the type shown in FIG. 4.
FIG. 6 is a top plan view of the plotting device shown in FIG. 5.
Figure 7:
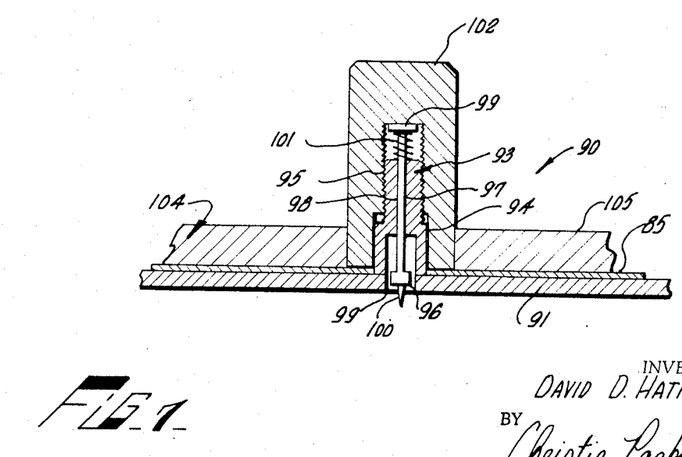
FIG. 7 is an enlarged cross-sectional elevation view taken along lines 7—7 of FIG. 5.

FIGS. 5, 6 and 7 show a plotting instrument 90 for use in developing a survey plot from photographs 85 taken with camera 10. The instrument includes a circular planar azimuth or base plate 91 fabricated of transparent plastic or the like and having a diameter slightly greater than the diameter of photograph 85. Around its periphery, base 91 carries scale 92 calibrated in circular degrees and fractions thereof. At the center of the base plate, a cylindrical post 93 is raised from the base plate. Immediately adjacent the upper surface of the base plate, the post has a circularly cylindrical portion 94 and above that and concentric thereto a threaded portion 95. The post has an axial hole 96 therein open to the underside of the base plate. An axial bore 97 is formed through the post. A needle plunger 98, having upper and lower heads 99 and a needle 100 extending coaxially downward, is journalled in bore 97 so that heads 99 lie outwardly of the opposite ends of the bore. A spring 101 is engaged between the upper head and the upper end of the post to bias the plunger upwardly of the post. An internally threaded knob 102 is engaged with the post and with the upper end of the needle plunger.

A photograph 85 is engaged between the bottom of the knob and the base plate circumferentially of post portion 94 by screwing the knob down on the post. Screwing the knob down on the post also extends the needle from the bottom of the instrument into a drafting table or the like.

The plotting instrument also includes an arm member 104 having a rectangular end portion 105 journalled around the lower exterior of knob 102 and an arm 106. The arm member preferably is fabricated of transparent plastic. Arm 106 has a width less than the width of portion 105. Portion 105 extends from knob 102 to the outer edge of base plate 91. The edge 107 of arm 106 which intersects portion 105 carries a scale 108 calibrated in inches and fractions of inches. A hairline 109 is scribed in portion 105 radially from the knob to arm edge 107. A plurality of reference or scaling lines 110 are scribed in portion 105 at radially spaced locations from the knob transversely of hairline 109, and include a central reference or scaling line 111. The scaling lines serve a function analogous to the function served by stadia hairs in a conventional surveyor's transit. Proceeding radially inwardly and outwardly from the central reference line, reference lines 110 are marked with selected values which serve as coefficients for determining the height of an object depicted in photograph 85.

Preferably photograph 85 is a three-times enlarged print of the negative provided by film 18. Central reference line 111 is located radially from knob 102 a distance such that it overlies the position on the photograph corresponding to the intersection of optical axis 37 with film 18. Accordingly, points on the photograph below the central reference line correspond to points at the survey site lying in the same horizontal plane as the center of the objective lens system at the time of the taking of the photograph. Points on the photograph radially outwardly from the central reference line were above the center of the objective lens system at the time the photograph was made.

Figure 8:
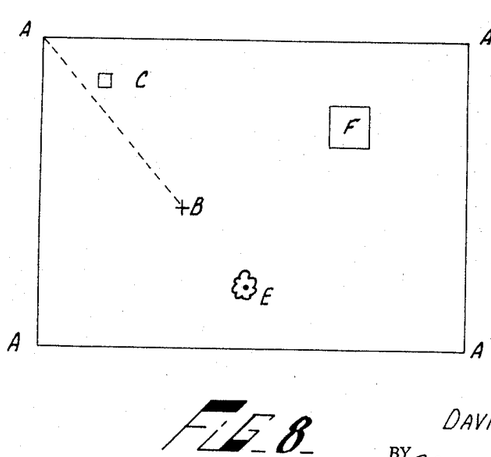
FIG. 8 shows one stage in the preparation of a survey plot from the photographs shown in FIG. 4.

As to plotting of the data recorded on the photographs obtained by use of camera 10, it is assumed that the corners of the property surveyed have been established on three or more points of known positions and that these points were flagged with range poles or the like to be visible in the photographs at the time the photographs were made. Also, as described above, a bench mark of known elevation must be located at a point visible in one of the photographs. The basic property outline (points A in FIG. 8) is then plotted to scale on a drawing board and the two chosen positions of the camera are plotted relative to this area; these points may be plotted first and the property outlines second since the distance between the chosen points is known. In FIGS. 8 and 9, the chosen points are designated B and D. Assume that point B is the first chosen point referred to in the foregoing description.

A photograph taken at point B is selected and placed in the plotting instrument and the instrument secured in position over point B on the plot by use of needle 100. The photograph is turned on the drawing until the image of point D on the photograph is aligned with point D on the plot drawing; the photograph is then secured to the plot with transparent drafting tape. A point of interest, such as one of property corners A, is then located and hairline 109 is placed over the image of the range pole located at this point; if the range pole incorporates the features of a stadia rod, the distance of the range pole from point B may be determined by reference to scaling lines 110 and the stadia marks on the image. The true location of the property corner may then be plotted; if no stadia marks are present in the image, the vector along which corner A has from point B is drawn. Other points of interest visible in the photograph, such as tree E and building F, may be completely or partially located in the same manner. Other photographs taken at point B may be required if elevations are to be determined. A photograph taken at point D is then selected, placed in the plotting instrument, and located over the drawing as described above. The appropriate points of interest can be fixed with certainty and accuracy along the rays from point B at the intersections of corresponding rays from point D, as shown in FIG. 9.

Figure 9:
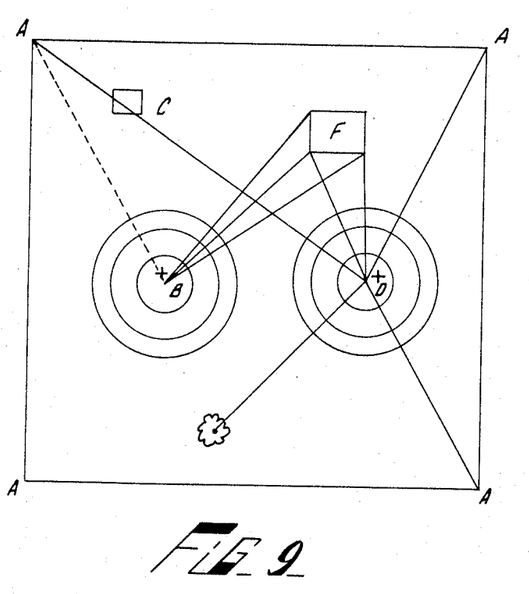
FIG. 9 shows a further stage in the preparation of a survey plot.

A bench mark on the surveyed property is designated C in FIGS. 8 and 9 and is used where elevations at various locations are to be set forth in the survey report. As noted above, where elevations are significant, a stadia rod is used at the points of interest when the photographs are made, and their use enables the determination of elevation of the various points relative to the camera for any location of the camera. The elevation of point B relative to bench mark C is determined by computing the elevation of a known point on a stadia rod over the bench mark relative to a horizontal reference plane through the camera objective lens. This is done by noting the position of the point on the stadia rod image relative to the scaling marks on instrument 90; the cofficient given on appropriate scaling mark 110 and the distance between C and B can be applied trigonometrically to give the elevation of the point relative to the camera at point B. The elevations of other points in other photographs marked with stadia rods relative to point B (or point D) can be determined in the same manner.

Preferably the spacing between scaling lines 110 corresponds to the distance between stadia rod marks photographed at 100 feet and shown in a photograph enlarged three times from the photographic negative. The coefficients scribed on instrument 90 thus correspond to changes in height of one foot each at 100 feet from the camera, i.e., the center point of the instrument.

Preferably arm member 104 includes a magnifying lens 115 in the portion of the arm member which overlies a photograph in the plotting instrument. The magnifying lens may be molded integral with arm member or may be set into the arm member. The lens is of a size and position on the arm member that it can be moved into position over any point of a photograph in the instrument merely by turning the arm member relative to the photograph. The lens is provided for easier reading of fine detail in the photograph.

It has been found that proper use of camera 10 reduces the time spent by a surveyor in the field by 80%. Drafting and computing time is reduced about 50%. Since practically all data required for a survey is present on photographs, field notes are minimized and the possibility of error is all but eliminated. Moreover, the results of a survey performed in accord with the foregoing description is accurate to within 2%.

The invention has been described above by reference to certain structures and procedural operations which have been set forth merely for the purposes of example and explanation. Persons skilled in the art to which this invention relates will appreciate that modifications in these structures and operations may be made without departing from the scope of this invention. Accordingly, the foregoing is not to be regarded as limiting the scope of this invention beyond the fair meaning of the following claims.

What is claimed is:

1. A plotting instrument for use in preparing a surveyor's report and plot from circular photographs obtained by the use of a rotary turret camera having an optical axis spaced laterally from the turret rotational axis, the photograph depicting the scene visible for 360° around the location of such a camera on a site to be surveyed and being enlarged according to a selected ratio from the exposure made at said site, the instrument comprising a circular azimuth plate having a diameter greater than the diameter of the photograph and defining around its periphery a scale graduated in circular degrees, an arm member fabricated of transparent material rotatably engaged with the azimuth plate about the center of the azimuth plate, the arm member having a base portion overlying the azimuth plate and an arm portion extending substantially radially from the azimuth plate, the arm portion defining a straight edge extending therealong radially of the azimuth plate, means for clamping a photograph between the azimuth plate and the base portion of the arm member concentric to the azimuth plate, needle means carried by the azimuth plate coaxially thereof and extensible from the side of the azimuth plate opposite from the arm member, the arm member base portion defining a hairline extending colinearly with said straight edge, an arcuate reference line normally traversing the hairline a distance from the center of the azimuth plate equal to the radial spacing of the optical axis of the camera from the rotational axis of the camera turret times the value of said selected ratio, and a plurality of arcuate scaling lines spaced apart from each other on opposite sides of the reference line, the scaling lines normally traversing the hairline.

2. A camera for use in topographical surveying and the like comprising a housing defining at an upper portion thereof an opening therethrough having substantially coplanar boundaries; film guide means for guiding a length of photographic film along a selected path in the housing past the opening; an optics turret mounted to the housing over the opening for rotation about an axis normal to the plane of the housing opening; an optical system carried by the turret including an objective lens and a reflector arranged to define an optical axis having a first portion normal to the turret rotational axis and a second portion passing on the side of the turret rotational axis opposite from the objective lens parallel to the turret rotational axis in spaced relation thereto through the opening to intersect the portion of the film path adjacent the opening, the optical system including an exposure aperture member defining therethrough radially of the turret axis an aperture through which the second portion of the optical axis passes; drive means for rotating the turret about its rotational axis so that there is formed on film disposed adjacent the opening a latent image of a scene swept by the objective lens, the latent image being erect relative to the turret rotation axis; the drive means comprising a turret drive motor in the housing, a first battery in the housing, a relay switch operable for coupling the first battery to the turret drive motor, a second battery in the housing of lower voltage than the first battery, and a second switch disposed exteriorly of the housing operable at a location remote from the housing for coupling the second battery to the relay switch for energizing the relay switch thereby to couple the first battery to the turret drive motor; controllable means for indexing photographic films sequentially along the selected path; and means for securing the film in a predetermined position adjacent the opening between operations of the controllable means.

3. A camera for use in topographical surveying and the like comprising a housing defining at an upper portion thereof an opening therethrough having substantially coplanar boundaries; film guide means for guiding a length of photographic film along a selected path in the housing past the opening; an optics turret mounted to the housing over the opening for rotation about an axis normal to the plane of the housing opening; an optical system carried by the turret including an objective lens and a reflector arranged to define an optical axis having a first portion normal to the turret rotational axis and a second portion passing on the side of the turret rotational axis opposite from the objective lens parallel to the turret rotational axis in spaced relation thereto through the opening to intersect the portion of the film path adjacent the opening, the optical system including an exposure aperture member defining therethrough radially of the turret axis an aperture through which the second portion of the optical axis passes; drive means for rotating the turret about its rotational axis so that there is formed on film disposed adjacent the opening a latent image of a scene swept by the objective lens, the latent image being erect relative to the turret rotational axis; the drive means including a turret drive motor in the housing, a battery in the housing, and a first switch operable for coupling the battery to the turret drive motor; controllable means for indexing photographic films sequentially along a selected path and including a rotatable film take-up drum, a film advance motor coupled to the film take-up drum for rotating the drum in response to operation of said motor, time delay switch means operable for coupling said motor to the battery, and means for energizing the time delay switch means during operation of the turret drive motor, the time delay switch means timing out and operating after operation of the turret drive motor is completed; and means for securing the film in a predetermined position adjacent the opening between operations of the controllable means.

4. A camera according to claim 3 wherein the means for securing the film comprises clamp means for holding the film stationary during operation of the turret drive motor, and means operable with the film advance motor for disengaging the clamp means from the film.

5. A camera for use in topographical surveying and the lie comprising a housing defining at an upper portion thereof an opening therethrough having substantially coplanar boundaries; film guide means for guiding a length of photographic film along a selected path in the housing past the opening; an optics turret mounted to the housing over the opening for rotation about an axis normal to the plane of the opening; an optical system carried by the turret including an objective lens and a reflector arranged to define an optical axis having a first portion normal to the turret rotational axis and a second portion passing on the side of the turret rotational axis opposite from the objective lens parallel to the turret rotational axis in spaced relation thereto through the opening to intersect the portion of the film path adjacent the opening, the optical system including an exposure aperture member defining therethrough radially of the turret axis an aperture through which the second portion of the optical axis passes; drive means for rotating the turret about its rotational axis so that there is formed on film disposed adjacent the opening a latent image of a scene swept by the objective lens, the latent image being erect relative to the turret rotational axis; the turret drive means including a turret drive motor in the housing operatively connected to the turret for rotating the turret relative to the housing, a first battery in the housing, a relay switch for operatively coupling the first battery and the turret drive motor, a second battery in the housing, means operable either in response to a signal originating at the camera or in response to a selected signal originating remote from the camera for operatively coupling the second battery and the relay switch to operate the relay switch thereby to couple the first battery to the turret drive motor, and means for generating said selected signal; controllable means for indexing photographic film sequentially along the selected path and including a film take-up drum and a film guide roller in the housing, a film advance motor coupled to the take-up drum for rotating the drum in response to operation of the film advance motor, a second switch operable for coupling the film advance motor to the first battery for operation of the film advance motor, time delay means coupled to the second switch for operating the same a predetermined time after energization of the time delay means, and first, second and third cam actuated switches, first cam means cooperating with the first cam actuated switch for operating said switch upon and during rotation of the turret, the first cam actuated switch being coupled in parallel with the relay switch, the second cam means cooperating with the second cam actuated switch for operating said switch during a terminal portion of the rotation of the turret to energize the time delay means, the duration of said terminal portion of the rotation of the turret being less than the predetermined time of the time delay means, and third cam means cooperating with the third cam actuated switch upon rotation of the film guide roller and during a period of rotation thereof corresponding to one frame advance of the film, the third cam actuated switch being connected in parallel with the second switch to the first battery and the film advance motor; and means for securing the film in a predetermined position adjacent the opening between operations of the controllable means and including a pressure plate, means biasing the pressure plate into advance preventing engagement with the film, and a solenoid coupled in parallel with the film advance motor operable for moving the pressure plate out of advance preventing engagement with the film.

6. A camera for use in topographical surveying and the like comprising a housing defining an opening through an upper portion thereof; a rotatable optics turret mounted to the housing over the opening; film guide means for guiding a length of photographic film along a selected path in the housing past the opening and for maintaining film disposed adjacent the opening in a planar orientation during rotation of the turret; drive means for rotating the turret about an axis normal to the plane of film disposed adjacent the opening; an optical system carried by the turret arranged to scan laterally of said axis of rotation and to project on film disposed adjacent the opening an image of a scene scanned by the optical system, said image being erect relative to the turret rotational axis; the turret drive means including a turret drive motor in the housing, a battery in the housing for powering the turret drive motor, a relay switch for operatively coupling the first battery and the turret drive motor, energizing means in the housing for operating the relay switch, and means operable either in response to a signal originating at the camera or in response to a selected signal originating remote from the camera for operatively coupling the energizing means and the relay switch to operate the relay switch thereby to couple the battery to the turret drive motor, and means for generating said selected signal; means for indexing photographic films sequentially along the selected path; and indicator means mounted to the housing operative during operation of the turret drive motor to visually indicate such motor operation.

7. A camera for use in topographical surveying and the like comprising a housing defining an opening through an upper portion thereof; a rotatable optics turret mounted to the housing over the opening; film guide means for guiding a length of photographic film along a selected path in the housing past the opening and for maintaining film disposed adjacent the opening in a selected plane during rotation of the turret; drive means for rotating the turret about an axis normal to the selected plane; an optical system carried by the turret arranged to scan laterally of said turret rotational axis and to project upon film disposed in the selected plane an image of a scene scanned by the optical system, said image being erect relative to the turret rotational axis; the turret drive means including a turret drive motor and a battery therefor in the housing; controllable means for indexing photographic films sequentially along the selected path and including a film take-up drum and a film guide roller in the housing, a film advance motor coupled to the take-up drum for rotating the drum in response to operation of the film advance motor, a switch operable for coupling the film advance motor to the battery for operation of the film advance motor, time delay means coupled to the switch for operating the same a predetermined time after energization of the time delay means, cam and cam actuated switch means responsive to rotation of the turret for disabling operation of the film advance motor during rotation of the turret and for energizing the time delay means at a time prior to completion of a rotation of the turret less than said predetermined time, and switch means responsive to movement of film along the selected path a distance corresponding to one frame advance of the film for disconnecting the film advance motor from the battery.

8. A camera for use in topographical surveying and the like comprising a housing defining an opening through an upper portion thereof; a rotatable optics turret mounted to the housing over the opening; film guide means for guiding a length of photographic film along a selected path in the housing past the opening and for maintaining film disposed adjacent the opening in selected plane during rotation of the turret; drive means for rotating the turret about an axis normal to the selected plane; an optical system carried by the turret arranged to scan laterally of the turret rotational axis and to project upon film disposed in the selected plane an image of a scene scanned by the optical system, said image being erect relative to the turret rotational axis; and controllable means for indexing photographic film sequentially along the selected path and including a film advance motor in the housing; means responsive to operation of the turret drive means for disabling operation of the film advance motor during operation of the turret drive means; the film guide means including a pressure plate disposed adjacent the housing opening, means normally biasing the pressure plate into advance preventing engagement with film threaded along the selected path, and responsive to operation of the film advance motor for moving the pressure plate out of advance preventing engagement with film threaded along the selected path.

9. A plotting instrument for use in preparing a surveyor's report and plot from circular photographs obtained by the use of a rotary turret camera having an optical axis spaced laterally from the turret rotational axis, the photograph depicting the scene visible for 360° around the location of such a camera on a site to be surveyed and being enlarged according to a selected ratio from the exposure made at said site, the instrument comprising a circular azimuth plate having a diameter greater than the diameter of the photograph and defining around its periphery a scale graduated in circular degrees, an arm member fabricated of transparent material rotatably engaged with the azimuth plate about the center of the azimuth plate, the arm member having a base portion overlying the azimuth plate and an arm portion extending substantially radially from the azimuth plate, the arm portion defining a straight edge extending therealong radially of the azimuth plate, means for clamping a photograph between the azimuth plate and the base portion of the arm member concentric to the azimuth plate, the arm member base portion defining a hairline extending collinearly with said straight edge, a reference line normally traversing the hairline a distance from the center of the azimuth plate equal to the radial spacing of the optical axis of the camera from the rotational axis of the camera turret times the value of said selected ratio, and a plurality of scaling lines spaced apart from each other on opposite sides of the reference line and normally traversing the hairline.

References Cited
UNITED STATES PATENTS

| | | | |
|---|---|---|---|
| 2,737,864 | 3/1956 | Gutterman | 95—15 X |
| 697,738 | 4/1902 | Miller | 95—15 X |
| 3,016,001 | 1/1962 | Sonne | 95—15 |

FOREIGN PATENTS

| | | |
|---|---|---|
| 175,806 | 3/1922 | Great Britain. |

JOHN M. HORAN, *Primary Examiner.*